UNITED STATES PATENT OFFICE.

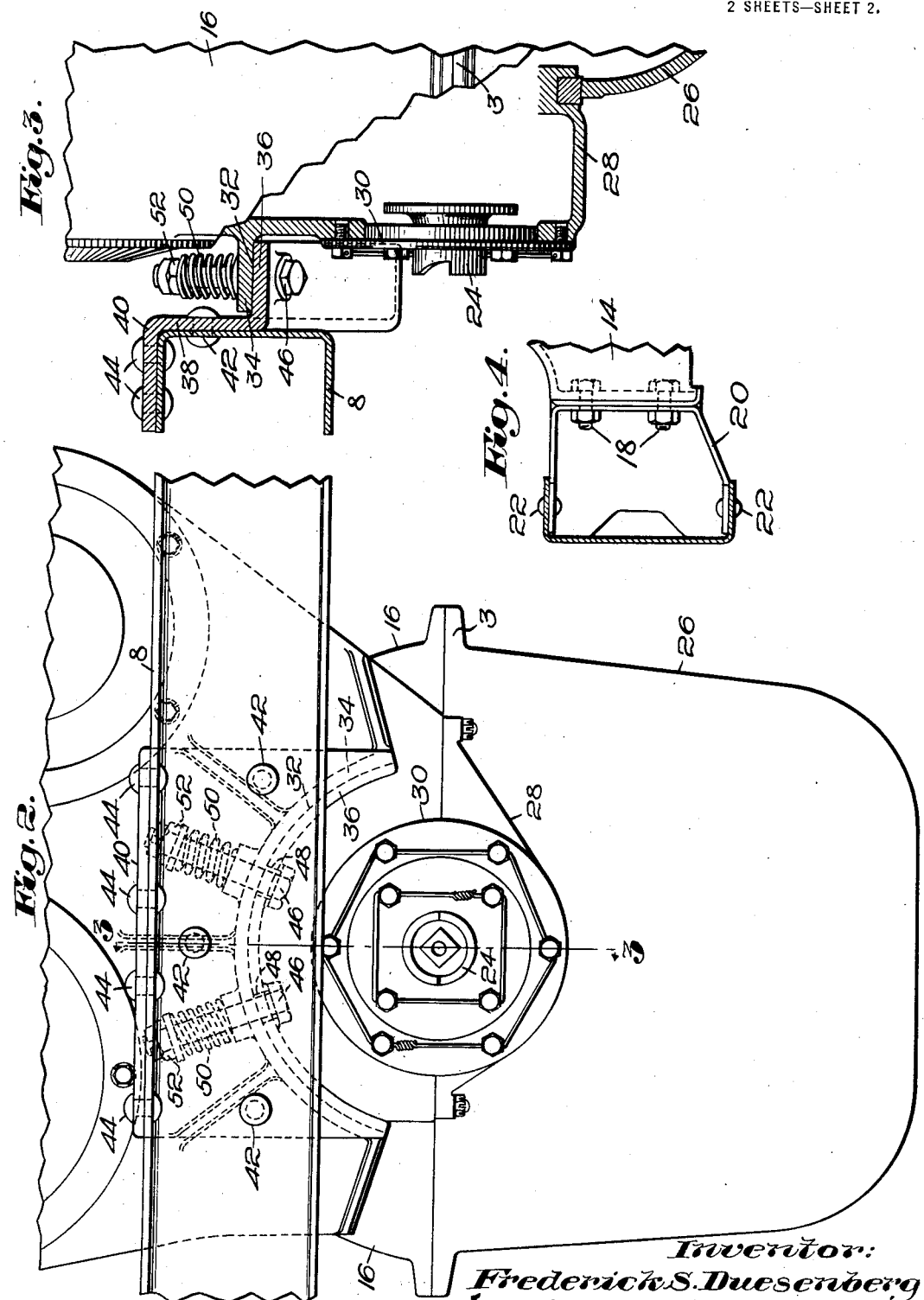

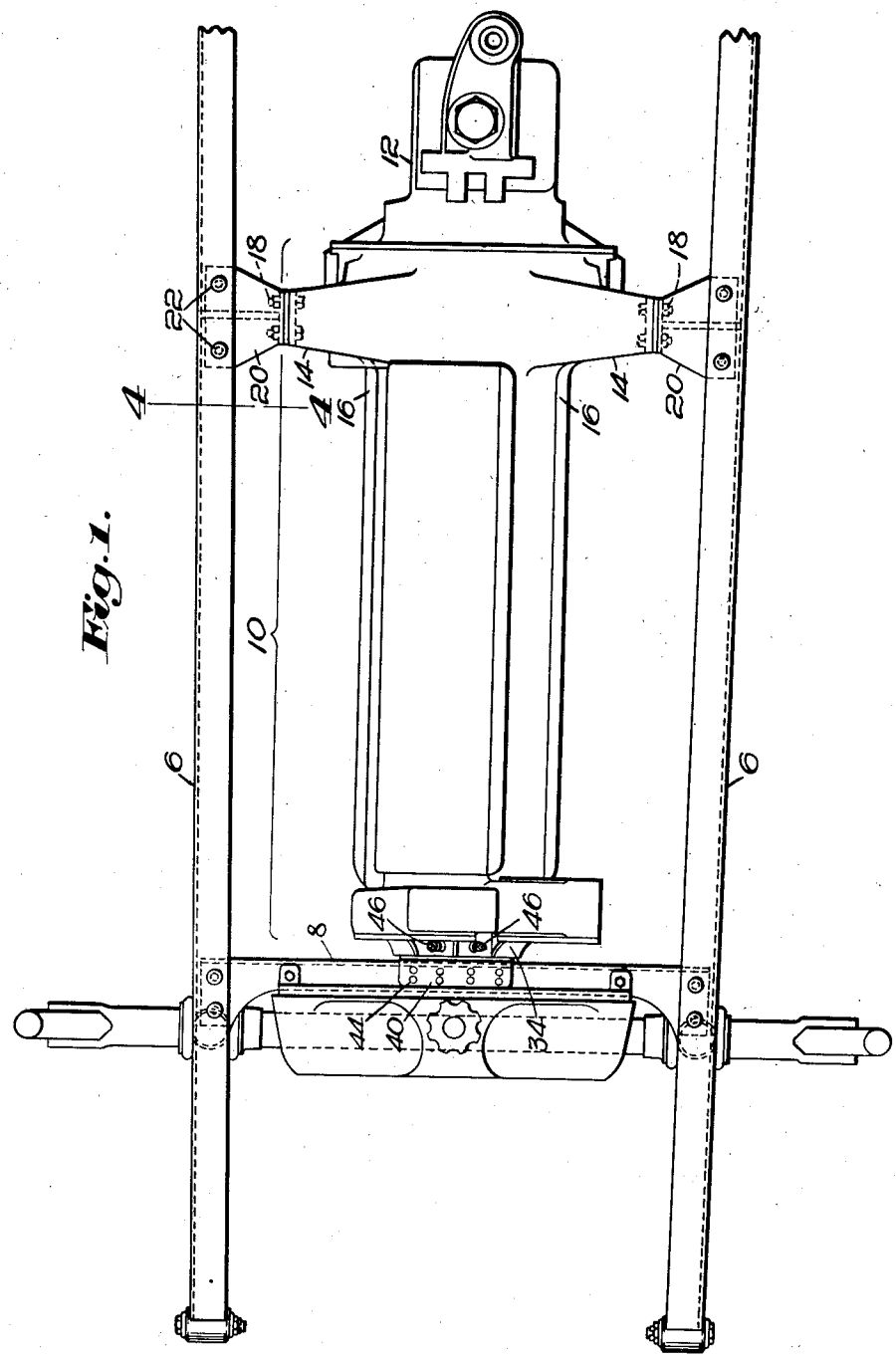

FREDERICK S. DUESENBERG, OF ELIZABETH, NEW JERSEY.

MOTOR VEHICLE.

1,405,904.  Specification of Letters Patent.  Patented Feb. 7, 1922.

Application filed January 4, 1921. Serial No. 434,996.

*To all whom it may concern:*

Be it known that I, FREDERICK S. DUESENBERG, a citizen of the United States, and a resident of Elizabeth, in the county of Union and State of New Jersey, have invented an Improvement in Motor Vehicles, of which the following description in connection with the accompanying drawings, is a specification, like characters on the drawings representing like parts.

This invention relates to motor vehicles, and aims to provide an improved flexible mounting of the power plant on the chassis frame to prevent distortions of the latter from being transmitted to the power plant, while still permitting the convenient removal of the under side of the crank-case and the crank-shaft, without the necessity of disturbing the mounting of the power plant.

My invention will be best understood by reference to the following description, when taken in connection with the accompanying drawings of one specific embodiment thereof, while its scope will be more particularly pointed out in the appended claims.

In the drawings:

Fig. 1 is a plan of the front portion of a motor vehicle exemplying my invention;

Fig. 2 is a front elevation of a portion of the chassis frame and the motor at an enlarged scale;

Fig. 3 is a sectional view on line 3—3 of Fig. 2; and

Fig. 4 is a sectional view at an enlarged scale on line 4—4 of Fig. 1.

Referring to the drawings, and to the embodiment of my invention which is herein selected for exemplification, I have shown a portion of a motor vehicle having a chassis frame comprising a pair of longitudinal side members 6 and a cross member 8, the latter being adjacent the forward end of the frame. Any usual or suitable power plant, herein comprising an internal combustion engine or motor 10 and transmission gear set 12, is appropriately supported adjacent its rear end as by arms 14 projecting laterally from and conveniently formed as integral parts of the upper part 16 of the engine crank-case, said arms being suitably attached to the side members 6 as by bolts 18 which secure them to brackets 20, the latter in turn being secured to the side members as by rivets 22.

The engine is provided with any usual or suitable crank-shaft, a portion of which is shown at 24 housed in the crank-case, the under side 26 of which is commonly called the oil pan because it receives the oil which drains back into the crank-case, whence it passes to an oil pump (not shown), which delivers the oil to the various bearings of the engine. The front end of the crank-case about the crank-shaft is herein closed by an under cap 28 and a front plate 30, which may be removed in obtaining access to the crank-shaft for the purpose of dismounting the latter.

It is well known that the chassis frame of a motor vehicle is subject to more or less distortion, which is apt to be transmitted to the power plant, and cause distortion of the latter, unless the same is flexibly supported on the frame. The character of the flexible connection should be such that relative movement of the frame and motor will take place about the axis of the crank-shaft; otherwise the axis of the latter may be shifted laterally when the frame becomes distorted. It has been proposed to provide a mounting giving this desirable result, but heretofore the character of such mountings has been such as to interfere with the removal of the crank-shaft, or at least to make the dismounting of the latter inconvenient. Sometimes, also, the construction of these mountings has made it inconvenient or impossible to obtain access to the gearing which transmits power from the crank-shaft to the cam-shaft and their accessory shaft or shafts. These undesirable features are avoided in the mounting which will now be described.

To the end that relative movement between the frame and the motor shall take place about the axis of the crank-shaft, I have herein provided an arcuate mounting in which one of the parts is provided with a surface 32 which is formed on an arc of a circle struck from the axis of the crank-shaft as a center. This surface is herein wholly above the axis of the crank-shaft, and the radius is sufficiently great to provide a large free space about the forward end of the crank-shaft, thereby to permit the convenient removal of the front cover-plate 30 and the cap 28, without the necessity of disturbing the mounting. In the present example, there are two superposed parts 34 and 36, one of which is conveniently formed as a flange projecting from the front end of the upper side 16 of the crank-case, and the other as a flange on a bracket 38 suitably formed on or secured to the cross member 8. In this example, the bracket 38 is provided with a second flange 40 which overlies and rests upon the upper side of the cross member 8. The bracket may be conveniently secured to the cross member by rivets 42 and 44.

Suitable means are provided to retain the flange 34 in place upon the flange 36, while still permitting one to turn with relation to the other about the axis of the crank-shaft, such means conveniently comprising one or more, herein two, bolts 46 extending through both flanges, one of the latter, herein the flange 36, being provided with openings 48, which receive the bolts and permit a certain amount of free play of the latter. Preferably the connection between the two flanges is resiliently yieldable in a vertical direction, thereby to permit a slight separation of the flanges when extreme distortion of the frame takes place; and to this end, I have provided helically coiled springs 50 encircling the bolts. One end of each spring bears against an abutment, herein a nut 52 threaded onto the latter, while the other end of the spring rests against one of the flanges, herein the upper flange 34. The location of the springs above the flanges is preferred, because the working space about the forward end of the crank-shaft is much greater than if they were arranged below the flange. Another important advantage of the described mounting is that the cross member 8 does not require to be curved or offset in a downward direction. Its central portion is therefore at a considerable distance above the axis of the crank-shaft, and presents no substantial interference with the work of dismounting the latter.

Having thus described one embodiment of my invention, but without limiting myself thereto, what I claim and desire by Letters Patent to secure is:

1. In a motor vehicle, the combination of a frame having a pair of side members, a motor support supported by said side members and presenting an arch-like, segmental portion, and a motor having one end supported by such portion with its shaft substantially concentric therewith and mounted to turn about the axis thereof.

2. In a motor vehicle, the combination of a frame having a pair of side members, a motor support supported by said side members and presenting an arch-like, segmental portion, and a motor presenting a corresponding arch-like portion resting on said support with its shaft substantially concentric therewith and mounted to turn about the axis thereof.

3. In a motor vehicle, the combination of a frame having a pair of side members, a motor support supported by said side members and presenting an arch-like, segmental portion having two ends separated by a space, and a motor having one end supported by such portion with its shaft substantially concentric therewith and accessible by reaching upward from below such portion.

4. In a motor vehicle, the combination of a frame having a pair of side members, a motor support supported by said side members, a motor having an arcuate surface resting upon and supported by said support, said motor having a crank-shaft whose axis is the axis of said arcuate surface, and resilient means to retain said motor upon said support while still allowing relative turning movement of one relatively to the other about said axis.

5. In a motor vehicle, the combination of a frame presenting an arch-like motor support affording an opening presented in a downward direction, and a motor supported by said support and having its adjacent end accessible by reaching upward into said opening.

6. In a motor vehicle, the combination of a frame having a pair of side members and a cross-member, a bracket secured to said cross-member and presenting a rearwardly projecting arcuate flange, and a motor presenting a forwardly projecting arcuate flange supported by the first-mentioned flange, said motor having a crank-shaft whose axis is the axis of said arcuate flanges.

7. In a motor vehicle, the combination of a frame having a pair of side members and a cross-member, a bracket secured to said cross-member and presenting a rearwardly projecting arcuate flange, a motor presenting a forwardly projecting arcuate flange supported by the first-mentioned flange, said motor having a crank-shaft whose axis is the axis of said arcuate flanges, and means to retain said flanges one upon the other.

8. In a motor vehicle, the combination of a frame having a pair of side members and a cross-member, a bracket secured to said cross-member and presenting a rearwardly projecting arcuate flange, a motor presenting a forwardly projecting arcuate flange supported by the first-mentioned flange, said motor having a crank-shaft whose axis is the axis of said arcuate flanges, and means extending through said flanges to retain one upon the other.

9. In a motor vehicle, the combination of a frame having a pair of side members and a cross-member, a bracket secured to said cross-member and presenting a rearwardly projecting arcuate flange, a motor presenting a forwardly projecting arcuate flange supported by the first-mentioned flange, said motor having a crank-shaft whose axis is the axis of said arcuate flanges, one or more bolts extending through said flanges, and spring means urging one flange toward the other.

10. In a motor vehicle, the combination of a frame having a pair of side members and a cross-member, a bracket secured to said cross-member and presenting a rearwardly projecting arcuate flange, a motor presenting a forwardly projecting arcuate flange supported by the first-mentioned flange, said motor having a crank-shaft whose axis is the axis of said arcuate flanges, one or more bolts extending through said flanges, and one or more springs encircling said bolt or bolts and urging one flange toward the other.

11. In a motor vehicle, the combination of a frame, a motor having a crank-case comprising upper and lower separable parts presenting an opening at the front, a crank-shaft received in said crank-case and accessible through said opening, and motor supporting means by which said motor is supported on said frame to turn about the axis of said crank-shaft, said supporting means being disposed above said opening.

12. In a motor vehicle, the combination of a frame, a motor having a crank-case comprising upper and lower separable parts presenting an opening at the front, a plate received in said opening, a crank-shaft received in said crank-case and extending into said plate, and motor supporting means by which said motor is supported on said frame to turn about the axis of said crank-shaft, said supporting means having provision to permit said plate to be removed without disturbing said supporting means.

In testimony whereof, I have signed my name to this specification.

FREDERICK S. DUESENBERG.